(12) United States Patent
Hidding et al.

(10) Patent No.: US 11,013,100 B2
(45) Date of Patent: May 18, 2021

(54) PLASMA ACCELERATOR

(71) Applicant: University of Strathclyde, Glasgow (GB)

(72) Inventors: Bernhard Hidding, Glasgow (GB); Grace Manahan, Glasgow (GB); Fahim Ahmad Habib, Glasgow (GB); Paul Scherkl, Glasgow (GB)

(73) Assignee: University of Strathclyde, Glasgow (GB)

( * ) Notice: Subject to any disclaimer, the term of this patent is extended or adjusted under 35 U.S.C. 154(b) by 0 days.

(21) Appl. No.: 16/341,039

(22) PCT Filed: Sep. 29, 2017

(86) PCT No.: PCT/GB2017/052942
§ 371 (c)(1),
(2) Date: Apr. 10, 2019

(87) PCT Pub. No.: WO2018/069670
PCT Pub. Date: Apr. 19, 2018

(65) Prior Publication Data
US 2019/0239332 A1    Aug. 1, 2019

(30) Foreign Application Priority Data

Oct. 10, 2016 (GB) .................................... 1617173

(51) Int. Cl.
*H05H 1/54* (2006.01)
*H05H 15/00* (2006.01)
(Continued)

(52) U.S. Cl.
CPC ............. *H05H 1/54* (2013.01); *H01S 3/0903* (2013.01); *H05H 1/46* (2013.01); *H05H 15/00* (2013.01)

(58) Field of Classification Search
None
See application file for complete search history.

(56) References Cited

U.S. PATENT DOCUMENTS 4,256,966 A     3/1981 Heinz
4,506,229 A *   3/1985 Prosnitz ................ H01S 3/0903
                                                    315/3.5
(Continued)

FOREIGN PATENT DOCUMENTS

DE         2926873 A1     1/1981
DE     102008008614 A1    8/2009
(Continued)

OTHER PUBLICATIONS

European Patent Office, International Search Report and Written Opinion, dated Dec. 14, 2017, for International Application No. PCT/GB2017/052942, 9 pages, The Netherlands.
(Continued)

*Primary Examiner* — Amy Cohen Johnson
*Assistant Examiner* — Srinivas Sathiraju
(74) *Attorney, Agent, or Firm* — Alston & Bird LLP (57) ABSTRACT

A method of accelerating charged particles in a plasma and an associated plasma accelerator and electromagnetic radiation source, the method including creating a region of non-uniform electric field within the plasma which propagates through the plasma; using the non-uniform electric field to accelerate a first plurality of charged particles in the direction of propagation of the region of non-uniform electric field; and once the accelerating first plurality of charged particles have propagated part-way through the plasma: adding a second plurality of charged particles to the plasma, such that the second plurality of charged particles propagates through the plasma, the second plurality of charged particles create a local distortion in the non-uniform electric field experienced by the accelerating first plurality of
(Continued)

charged particles, and the local distortion in the non-uniform electric field propagates through the plasma with the accelerating first plurality of charged particles; and the method also including using the local distortion in the non-uniform electric field to accelerate the first plurality of charged particles in the direction of propagation of the region of non-uniform electric field.

18 Claims, 5 Drawing Sheets

(51) Int. Cl.
  *H01S 3/09* (2006.01)
  *H05H 1/46* (2006.01)

(56) References Cited

U.S. PATENT DOCUMENTS

| | | | |
|---|---|---|---|
| 5,789,876 A | 8/1998 | Umstadter et al. | |
| 5,892,329 A * | 4/1999 | Arkhipov | H05H 1/54 313/362.1 |
| 5,931,859 A | 8/1999 | Burke | |
| 6,518,538 B2 | 2/2003 | Bernabei | |
| 6,629,974 B2 | 10/2003 | Penny et al. | |
| 7,049,736 B2 * | 5/2006 | Suk | G21K 1/003 313/231.01 |
| 7,408,303 B2 * | 8/2008 | Antropov | B64G 1/405 315/111.21 |
| 7,589,473 B2 | 9/2009 | Suslov | |
| 7,608,839 B2 | 10/2009 | Coulombe et al. | |
| 7,630,774 B2 | 12/2009 | Karni et al. | |
| 7,785,322 B2 | 8/2010 | Penny et al. | |
| 7,994,472 B2 * | 8/2011 | Plettner | H05H 7/06 250/251 |
| 8,030,849 B2 | 10/2011 | Suslov | |
| 8,150,532 B2 | 4/2012 | Karni et al. | |
| 8,269,197 B2 | 9/2012 | Goer et al. | |
| 8,299,713 B2 * | 10/2012 | Hooker | H05H 15/00 315/111.21 |
| 8,878,464 B2 * | 11/2014 | Clayton | G21K 1/025 315/500 |
| 8,894,644 B2 | 11/2014 | Stieber et al. | |
| 8,947,115 B2 * | 2/2015 | Rosenzweig | G01R 31/2881 324/754.22 |
| 9,022,914 B2 | 5/2015 | Clayton et al. | |
| 9,155,910 B1 * | 10/2015 | Sahadevan | H05H 7/06 |
| 9,215,788 B2 | 12/2015 | Karni et al. | |
| 9,226,790 B2 | 1/2016 | Zemel et al. | |
| 9,351,790 B2 | 5/2016 | Zemel et al. | |
| 9,424,955 B2 * | 8/2016 | Laberge | G21B 1/057 |
| 9,440,057 B2 | 9/2016 | Jacofsky et al. | |
| 9,536,698 B2 * | 1/2017 | Wong | H01J 37/06 |
| 9,596,745 B2 * | 3/2017 | Laberge | G21B 1/15 |
| 9,744,372 B2 | 8/2017 | Jacofsky et al. | |
| 9,875,816 B2 * | 1/2018 | Laberge | G21B 1/057 |
| 9,993,282 B2 | 6/2018 | Sheperak | |
| 10,438,702 B2 * | 10/2019 | Tuszewski | G21B 1/052 |
| 2002/0043520 A1 | 4/2002 | Bernabei | |
| 2002/0161362 A1 | 10/2002 | Penny et al. | |
| 2004/0195951 A1 * | 10/2004 | Suk | H05H 15/00 313/359.1 |
| 2004/0245085 A1 * | 12/2004 | Srinivasan | F02M 27/042 204/157.15 |
| 2006/0009763 A1 | 1/2006 | Goble et al. | |
| 2006/0150611 A1 * | 7/2006 | Allen | H05H 1/54 60/203.1 |
| 2006/0189974 A1 | 8/2006 | Penny et al. | |
| 2006/0189976 A1 | 8/2006 | Karni et al. | |
| 2006/0244385 A1 * | 11/2006 | Antropov | H05H 1/54 315/111.21 |
| 2007/0029500 A1 | 2/2007 | Coulombe et al. | |
| 2007/0058770 A1 * | 3/2007 | Fissenko | G21B 1/03 376/100 |
| 2007/0106349 A1 | 5/2007 | Karni et al. | |
| 2007/0135876 A1 | 6/2007 | Weber | |
| 2009/0039790 A1 | 2/2009 | Suslov | |
| 2009/0152094 A1 * | 6/2009 | Fissenko | G21B 1/03 204/155 |
| 2009/0326528 A1 | 12/2009 | Karni et al. | |
| 2010/0089742 A1 | 4/2010 | Suslov | |
| 2011/0011729 A1 * | 1/2011 | Poehlmann-Martins | H05H 15/00 204/164 |
| 2011/0017920 A1 | 1/2011 | Goer et al. | |
| 2011/0112528 A1 | 5/2011 | Stieber et al. | |
| 2011/0240888 A1 * | 10/2011 | Rosenzweig | G01R 31/2881 250/492.3 |
| 2012/0085916 A1 | 4/2012 | Clayton et al. | |
| 2012/0080618 A1 | 5/2012 | Clayton et al. | |
| 2012/0239120 A1 | 9/2012 | Karni et al. | |
| 2013/0345620 A1 | 12/2013 | Zemel et al. | |
| 2014/0131594 A1 * | 5/2014 | Hidding | H05H 15/00 250/503.1 |
| 2014/0147333 A1 | 5/2014 | Morfill et al. | |
| 2014/0171854 A1 | 6/2014 | Jacofsky et al. | |
| 2014/0200506 A1 | 7/2014 | Zemel et al. | |
| 2014/0207053 A1 | 7/2014 | Morfill et al. | |
| 2015/0182282 A1 | 7/2015 | Zemel et al. | |
| 2016/0027533 A1 * | 1/2016 | Fissenko | G21B 1/05 376/121 |
| 2016/0067522 A1 | 3/2016 | An et al. | |
| 2016/0113701 A1 | 4/2016 | Zemel et al. | |
| 2016/0226212 A1 * | 8/2016 | Tajima | H05G 2/00 |
| 2016/0276044 A1 * | 9/2016 | Tuszewski | H05H 1/14 |
| 2016/0375263 A1 | 12/2016 | Jacofsky et al. | |
| 2017/0080253 A1 | 3/2017 | Clayton | |
| 2017/0216615 A1 | 8/2017 | Pledge et al. | |
| 2017/0246468 A1 | 8/2017 | Kalghatgi et al. | |
| 2017/0303381 A1 | 10/2017 | Wang | |
| 2017/0339776 A1 | 11/2017 | Knoll et al. | |
| 2018/0133496 A1 | 5/2018 | Zuidervaart et al. | |
| 2018/0168024 A1 | 6/2018 | Mao et al. | |
| 2018/0310393 A1 * | 10/2018 | Castillo Acero | H05H 1/54 |
| 2019/0239332 A1 * | 8/2019 | Hidding | H05H 1/46 |

FOREIGN PATENT DOCUMENTS

| | | |
|---|---|---|
| DE | 102011100751 A1 | 11/2012 |
| DE | 102012103362 A1 | 10/2013 |
| EP | 0024504 B1 | 3/1983 |
| EP | 2704654 A1 | 3/2004 |
| EP | 1331892 B1 | 7/2006 |
| EP | 1693014 B1 | 7/2006 |
| EP | 2254664 B1 | 2/2008 |
| EP | 1810626 B1 | 1/2012 |
| EP | 1715810 B1 | 5/2012 |
| EP | 2704655 A1 | 3/2014 |
| EP | 2707098 A2 | 3/2014 |
| EP | 2760536 A1 | 8/2014 |
| EP | 2670477 B1 | 11/2015 |
| EP | 3086838 A1 | 11/2016 |
| EP | 3177328 A1 | 6/2017 |
| EP | 3199201 A1 | 8/2017 |
| EP | 3031306 B1 | 9/2017 |
| EP | 3216323 A1 | 9/2017 |
| EP | 3247179 A1 | 11/2017 |
| EP | 3302698 A1 | 4/2018 |
| EP | 2457236 B1 | 6/2018 |
| GB | 2528921 A | 2/2016 |
| GB | 2532195 A | 5/2016 |
| GB | 2548382 A | 9/2017 |
| WO | WO 2002/032332 A1 | 4/2002 |
| WO | WO-2006/077567 A1 | 7/2006 |
| WO | WO-2006/077582 A2 | 7/2006 |
| WO | WO-2009/101143 A1 | 8/2009 |
| WO | WO-2011/011222 A1 | 1/2011 |
| WO | WO-2012/045040 A1 | 4/2012 |
| WO | WO-2012/106735 A2 | 8/2012 |
| WO | WO-2012/150040 A1 | 11/2012 |
| WO | WO-2012/150041 A1 | 11/2012 |
| WO | WO-2012/158443 A2 | 11/2012 |

(56) References Cited

FOREIGN PATENT DOCUMENTS

| WO | WO-2013/040542 A1 | 3/2013 |
|---|---|---|
| WO | WO-2014/043512 A2 | 3/2014 |
| WO | WO-2015/019240 A1 | 2/2015 |
| WO | WO-2015/100451 A1 | 7/2015 |
| WO | WO-2015/169011 A1 | 11/2015 |
| WO | WO-2016/020407 A1 | 2/2016 |
| WO | WO-2016/071680 A1 | 5/2016 |
| WO | WO-2016/097831 A1 | 6/2016 |
| WO | WO-2016/112473 A1 | 7/2016 |
| WO | WO-2016/192997 A1 | 12/2016 |
| WO | WO-2017/030948 A1 | 2/2017 |
| WO | WO-2017/147362 A1 | 8/2017 |
| WO | WO-2017/151763 A1 | 9/2017 |
| WO | WO-2017/158370 A1 | 9/2017 |
| WO | WO-2017/162614 A1 | 9/2017 |
| WO | WO-2017/211331 A1 | 12/2017 |

OTHER PUBLICATIONS

The International Bureau of WIPO, International Preliminary Report on Patentability, dated Apr. 25, 2019, for International Application No. PCT/GB2017/052942, 8 pages, Switzerland.

International Search Report and Written Opinion, dated Dec. 14, 2017, for International Application No. PCT/GB2017/052942, pp. 1-9.

United Kingdom Search Report, dated Feb. 22, 2017, for GB Priority Application No. GB1617173.8, pp. 1-3.

Antici, P., et al. Laser-driven electron beamlines generated by coupling laser-plasma sources with conventional transport systems. J. Appl. Phys. 112, 044902 (2012).

Antipov, T., et al. Experimental demonstration of energy-chirp compensation by a tunable dielectric-based structure. Phys. Rev. Lett. 112, 114801 (2014).

Assmann, R., et al. Transverse beam dynamics in plasma-based linacs. Nucl. Instrum. Methods Phys. Res. A 410, 544-548 (1998).

Blumenfeld, I., et al. Energy doubling of 42 GeV electrons in a metre-scale plasma wakefield accelerator. Nature 445, 741-744 (2007).

Bonifacio, R., et al. Collective instabilities and high gain regime in free electron laser. Optics Commun. 50, 373-378 (1984).

Bourgeois, N., et al. Two-pulse ionization injection into Quasilinear Laser Wakefields. Phys. Rev. Lett. 111, 015003 (2013).

Braun, H., et al. Emittance growth during bunch compression in the CTF-II. Phys. Rev. Lett. 84, 658 (2000).

Carlsten, B. E., et al. High repetition-rate inverse Compton scattering x-ray source driven by a free-electron laser. J. Phys. B: At. Mol. Opt. Phys. 47, 234012 (2014).

Chou, S., et al. Collective Deceleration of Laser-Driven Electron Bunches. Phys Rev. Lett 117, 144801 (2016).

Clayton, C. E., et al. Ultrahigh-gradient acceleration of injected electrons by laser-excited relativistic electron plasma waves. Phys. Rev. Lett. 70, 37 (1993).

Di Mitri, S. On the importance of electron beam brightness in high gain free electron lasers. Photonics 2, 317-341 (2015).

Di Mitri, S., et al. Electron beam brightness in linac drivers for free-electron lasers. Phys. Rep. 539, 1-48 (2014).

Emma, C., et al. First lasing and operation of an Ångstrom-wavelength free-electron laser. Nat. Photon. 4, 641-647 (2010).

Emma, P., et al. Experimental demonstration of energy-chirp control in relativistic electron bunches using a corrugated pipe. Phys. Rev. Lett. 112, 034801 (2014).

Emma, P., et al. Systematic approach to damping ring design Phys. Rev. ST Accel. Beams 4, 021001 (2001).

Ersfeld, B., et al. The ion channel free-electron laser with varying betatron amplitude. New J. Phys. 16, 093025 (2014).

Esarey, E., et al. Overview of plasma-based accelerator concepts. IEEE Trans Plasma Sci. 24, 252-288 (1996).

Esarey, E., et al. Synchrotron radiation from electron beams in plasma-focusing channels. Phys. Rev. E 65, 056505 (2001).

Faure, J., et al. A laser-plasma accelerator producing monoenergetic electron beams. Nature 431, 541-544 (2004).

Ferrario, M., et al. Adiabatic plasma buncher. IEEE Trans. Plasma Sci. 28, 1152-1158 (2000).

Floettmann, K. Some basic features of the beam emittance. Phys. Rev. ST Accel Beams 6, 034202 (2003).

Geddes, C. D. R., et al. High-quality electron beams from a laser wakefield accelerator using plasma-channel guiding. Nature 431, 538-541 (2004).

Gholizadeh, R., et al. Preservation of beam emittance in the presence of ion motion in future high-energy plasma-wakefield-based colliders. Phys. Rev. Lett 104, 155001 (2010).

Godfrey, B. B., et al. Numerical stability of relativistic beam multidimensional PIC simulations employing the Esirkepov algorithm J. Comp. Phys. 248, 33-46 (2013).

Graves, W. S., et al. MIT inverse Compton source concept. Nuclear Instrum. Methods A 608, S103-S105 (2009).

Hidding, B., et al. Monoenergetic energy doubling in a hybrid laser-plasma wakefield accelerator. Phys. Rev. Lett. 104, 195002 (2010).

Hidding, B., et al. Ultracold electron bunch generation via plasma photocathode emission and acceleration in a beam-driven plasma blowout. Phys. Rev. Lett 108, 035001 (2012).

Hidding, B., et al. Ultrahigh brightness bunches from hybrid plasma accelerators as drivers of 5th generation light sources. J. Phys. B: At. Mol. Opt. Phys. 47, 234010.

Hogan, M. J., et al. Plasma wakefield acceleration experiments at FACET. New Phys. 12, 055030 (2010).

Katsouleas, T., et al. Beam loading in plasma accelerators. Part. Accel. 22, 81-99 (1987).

Kim, K. Y., et al. Single-shot measurement of laser-induced double step ionization of helium. Optics Express 10, 1563 (2002).

Kim, K.-J., et al. Towards advanced electron beam brightness enhancement and conditioning. Report No. ANL/APS/LS-305 (U.S. Department of Energy, 2003).

Kuschel, S., et al. Demonstration of passive plasma lensing of a laser wakefield accelerated electron bunch. Phys. Rev. Accel. Beams 19, 071301 (2016).

Leemans, W. P., et al. Multi-GeV electron beams from capillary-dischargedguided subpetawatt laser pulses in the self-trapping regime. Phys. Rev. Lett. 113, 245002 (2014).

Li, F., et al. Generating high-brightness electron beams via ionization injection by transverse colliding lasers in a plasma-wakefield accelerator. Phys. Rev. Lett 111, 015003 (2013).

Li, R. K., et al. Single-shot MeV transmission electron microscopy with picosecond temporal resolution. Phys. Rev. Appl. 2, 024003 (2014).

Litos, M., et al. High efficiency acceleration of an electron beam in a plasma wakefield accelerator. Nature 515, 92-95 (2014).

Lundh, O., et al. Few femtosecond, few kiloampere electron bunch produced by a laser-plasma accelerator. Nat. Phys. 7, 219-222 (2011).

Manahan, G. G., et al. Hot spots and dark current in advanced plasma Wakefield accelerators. Phys. Rev. Accel. Beams 19, 011303 (2016).

Manahan, G.G., et al. Single-stage plasma-based correlated energy spread compensation for ultrahigh 6D brightness electron beams. Nat. Commun. 8, 15705 (2007).

Mangles, S., et al. Monoenergetic beams of relativistic electrons from intense laser-plasma interactions. Nature 431, 535-538 (2004).

Martinez De La Ossa, A., et al. High-Quality Electron Beams from Beam-Driven Plasma Accelerators by Wakefield-Induced Ionization Injection. Phys. Rev. Lett. 111, 245003 (2013).

Masson-Laborde, P. E., et al. Giga-electronvolt electrons due to a transition from laser wakefield acceleration to plasma wakefield acceleration. Phys Plasmas 21, 123113 (2014).

Mehrling, T., et al. Transverse emittance growth in staged laser-wakefield acceleration. Phys. Rev. ST Accel. Beams 15, 111303 (2012).

Murphy, J. B., et al. Generation of high intensity coherent radiation in the soft xray and vacuum ultraviolet region. J. Opt. Soc. Am. B 2, 259 (1985).

(56) References Cited

OTHER PUBLICATIONS

Nieter, C., et al. Vorpal: A versatile plasma simulation code. J. Comp Physics 196, 448-478 (2004).

O'Shea, F. H., et al. Short period, high field cryogenic undulator for extreme performance x-ray free electron lasers. Phys. Rev. ST Accel. Beams 13, 070702 (2010).

Pae, K. H., et al. Self-mode-transition from laser wakefield accelerator to plasma wakefield accelerator of laser-driven plasma-based electron acceleration. Phys. Plasmas 17, 123104 (2010).

Pellegrini, C. The history of x-ray free electron lasers. Eur. Phys. J. H 37, 659-708 (2012).

Pellegrini, C., et al. The physics of x-ray free-electron lasers. Rev. Mod. Phys. 88, 015006 (2016).

Rosenzweig, J. B., et al. Acceleration and focusing of electrons in two-dimensional nonlinear plasma wake fields. Phys Rev. A 44, R6189 (1991).

Rousse, A., et al. Scaling of betatron x-ray radiation. Eur. Phys. J. 45, 391 (2007).

Saldin, E. L., et al. Self-amplified spontaneous emission FEL with energy chirped electron beam and its application for generation of attosecond pulses. Phys. Rev. ST Accel. Beams 9, 050707 (2006).

Saldin, E., et al. An analytical description of longitudinal phase space distortion in magnetic bunch compressors. Nuclear Instrum. Methods A 483, 516-520 (2002).

Schroeder, C., et al. Thermal emittance from ionization-induced trapping in plasma accelerators. Phys. Rev. ST Accel. Beams 17, 101301 (2014).

Schulz, S., et al. Femtosecond all-optical synchronization of an X-ray free-electron laser. Nat. Commun. 6, 5938 (2015).

Technical Design Report for the FACET-II project at SLAC National Accelerator Laboratory, SLAC-R-1072 (SLAC National Accelerator Laboratory, 2016).

Tsung, F. S., et al. Near-GeV energy laser wakefield acceleration of self-injected electrons in a centimetre-scale plasma channel Phys. Rev. Lett. 93, 185002 (2004).

Tzoufras, M., et al. Beam loading in the nonlinear regime of plasma-based acceleration. Phys. Rev. Lett. 101, 145002 (2008).

Vay, J. L., et al. Numerical methods for instability mitigation in the modeling of laser Wakefield accelerators in a Lorentz-boosted frame. J. Comp. Phys. 230, 15 (2011).

Wang, X., et al. Quasi-monoenergetic laser-plasma acceleration of electrons to 2 GeV. Nat. Commun. 4, 1988 (2013).

Whittum, D. H., et al. Ion-channel laser. Phys. Rev Lett. 64, 2511 (1990).

Wiggins, S. M., et al. High quality electron beams from a laser wakefield accelerator. Plasma Phys. Control. Fusion 52, 124032 (2010).

Wood, W. M., et al. Femtosecond growth dynamics of an underdense ionization front measured by spectral blueshifting. IEEE Trans. Plasma Sci. 21, 20-33 (1993).

Xi, Y., et al. Hybrid modeling of relativistic underdense plasma photocathode injectors. Phys. Rev. ST Accel. Beams 16, 031303 (2013).

Yu, L.-L., et al. Two-color laser-ionization injection. Phys. Rev. Lett. 112, 125001 (2014).

Zeitler, B., et al. Merging conventional and laser wakefield accelerators. Proc SPIE 8779, 877904 (2013).

Zhang, Z., et al. Electron beam energy chirp control with a rectangular corrugated structure at the Linac Coherent Light Source. Phys. Rev. ST Accel Beams 18, 010702 (2015).

Zhang, Z., et al. Longitudinal dynamics of twin electron bunches in the Linac Coherent Light Source. Phys. Rev. ST. Accel Beams 18, 030702 (2015).

\* cited by examiner

PLASMA ACCELERATOR

CROSS REFERENCE TO RELATED APPLICATIONS

This application is a National Stage Application, filed under 35 U.S.C. § 371, of International Application No. PCT/GB2017/052942, filed Sep. 29, 2017, which international application claims priority to United Kingdom Application No. 1617173.8, filed Oct. 10, 2016; the contents of both of which as are hereby incorporated by reference in their entirety.

BACKGROUND

Related Field

The present invention relates to a method for accelerating charged particles with a plasma accelerator, such as a method that accelerates electrons and improves the energy spread of the accelerated electrons, which, optionally but not essentially, may be used to generate electrons for a free electron laser (FEL) and other high intensity light sources. The present invention also relates to an associated plasma accelerator, and advanced light sources based on the accelerated charged particles.

Description of Related Art

Acceleration of electrons in laser, electron, positron or proton driven plasma waves can harness electric fields (E) that scale with electron density $n_0$ of the plasma as $E[GV/m] \sim 96 \sqrt{n_o[cm^{-3}]}$ in the linear regime approximation. For a typical plasma density of $n_0 \sim 10^{17}$ cm$^3$, electric fields of the order of 30 GV/m or more may be produced, which is orders of magnitude higher than in state-of-the-art radiofrequency driven accelerator systems which drive research-enabling machines, such as the Linac Coherent Light Source (LCLS) or other hard x-ray free-electron lasers (XFEL). These large electric fields produced using plasma waves allow the same total particle acceleration to be achieved in a meter-scale plasma accelerator as is achieved in a traditional km-scale accelerator.

Plasma accelerators have advanced from the generation of broadband electron beams and Maxwellian-like spectral flux to point-like, quasi-monoenergetic electron beams in the last decade. The so-called Trojan Horse plasma wakefield acceleration (TH-PWFA) and related schemes provide a further step change by decoupling the electron bunch generation from the plasma wave excitation in a highly flexible underdense plasma photocathode process. This allows for the generation and acceleration of ultracold electron bunches with transverse phase space and resulting values of normalized emittance $(\varepsilon_n)$ down to $\varepsilon_n = 10^{-9}$ m-rad and five dimensional beam brightness values $(b_5)$ up to $$b_5 = \frac{I_p}{\varepsilon_{n,x}\varepsilon_{n,y}} \sim 10^{20} Am^{-2} rad^{-2},$$

for typical peak currents $I_p$ of a few kA. This is orders of magnitude brighter than even the electron beams at world-leading facilities such as the LCLS. Electron emittance and brightness are key factors for realisation of hard x-ray FELs using plasma accelerators.

US 2014/0131594 A1 describes the so-called Trojan Horse plasma wakefield acceleration method.

The enormous accelerating fields in plasma accelerators inherently accelerate a plurality of charged particles, such as bunches of electrons, with large time-correlated energy spread. A large energy spread for charged particles prevents the use of plasma accelerators for the generation of high quality particle beams, which may be used in various fields of science, such as natural sciences, life sciences, or material science, and may be used in fundamental instruments in those fields, such as in the generation of x-rays, for example via the collective oscillation of charged particles and the associated radiation of photons, which may be used for medical imaging. Another possible application is in the free-electron laser, which requires both high brightness and low energy spread electrons.

The non-uniform electric fields in a plasma accelerator result in non-uniform acceleration of charged particles. The accumulated correlated energy spread in the accelerated charged particles is problematic on a number of levels: first, extraction of the charged particles from the plasma accelerator stage, which may require very challenging transport of large divergent beams, can substantially deteriorate the beam emittance due to chromatic effects and non-matched transverse forces. Similar effects occur during particle injection, and are further multiplied when staged acceleration is required where the energy gain in a single stage is insufficient for the respective application. Second, the energy spread can degrade the utility of the accelerated beam, for example if accelerated electrons are used for a free-electron laser (FEL), where the maximum relative energy spread $\delta W/W$ must be less than the Pierce parameter $\rho_{FEL} > \delta W/W$ to allow proper micro-bunching and gain (a typical value for an XFEL is $\rho_{FEL} \sim 10^{-3}$ to $10^{-4}$).

It is an object of at least one embodiment of at least one aspect of the present invention to seek to obviate or at least mitigate one or more problems in the art.

BRIEF SUMMARY

According to a first aspect of the invention there is provided a method of accelerating charged particles in a plasma, the method comprising:
creating a region of non-uniform electric field within the plasma which propagates through the plasma,
using the non-uniform electric field to accelerate a first plurality of charged particles in the direction of propagation of the region of non-uniform electric field,
once the accelerating first plurality of charged particles have propagated part-way through the plasma:
adding a second plurality of charged particles to the plasma, such that;
the second plurality of charged particles propagates through the plasma,
the second plurality of charged particles creates a local distortion in the non-uniform electric field experienced by the accelerating first plurality of charged particles, and
the local distortion in the non-uniform electric field propagates through the plasma with the accelerating first plurality of charged particles; and
using the local distortion in the non-uniform electric field to accelerate at least some or all of the first plurality of charged particles in the direction of propagation of the region of non-uniform electric field.

The non-uniform electric field and the local distortion in the non-uniform electric field may be longitudinal through the plasma in the direction of propagation of the non-uniform electric field. The non-uniform electric field may be created by the separation of the electrons and ions of the plasma. The local distortion in the non-uniform electric field may be created by distorting the non-uniform electric field with the second plurality of charged particles. The non-uniform electric field and the local distortion in the non-uniform electric field may be separate to any electric field which may create and/or maintain the plasma, such as an electromagnetic field that creates and/or maintains the plasma.

The local distortion in the non-uniform electric field may comprise at least one indicative feature. The indicative feature may be or comprise a peak, trough, valley, local minima or maxima, a region with an electric field constant within a threshold value, or the like. The at least one indicative feature may propagate through the plasma with the non-uniform electric field. The at least one indicative feature may change with time, for example as the second plurality of charged particles accelerate, or the indicative feature may stay constant with time as it propagates through the plasma. The local distortion may propagate through the plasma with the first plurality of charged particles, such that at least some or all of the first plurality of charged particles experience the local distortion in the non-uniform electric field, i.e. the magnitude of electric field at the location of at least some or all of the first plurality of charged particles may be different to the magnitude of electric field that would be present in the absence of the local distortion in the non-uniform electric field created by the second plurality of charged particles.

The non-uniform acceleration experienced by the first plurality of charged particles due to the non-uniform electric field may be at least partially, fully or over compensated for by the non-uniform acceleration experienced by the first plurality of charged particles due to the local distortion in the non-uniform electric field. The non-uniform acceleration experienced by the first plurality of charged particles due to the local distortion in the non-uniform electric field may narrow the energy distribution of the first plurality of charged particles, for example by one order of magnitude.

The non-uniform acceleration experienced by the first plurality of charged particles due to the non-uniform electric field may add chirp to the energy distribution of the first plurality of charged particles. The non-uniform acceleration experienced by the first plurality of charged particles due to the local distortion in the non-uniform electric field may at least partially or fully dechirp the energy distribution of the first plurality of charged particles. The non-uniform acceleration experienced by the first plurality of charged particles due to the local distortion in the non-uniform electric field may result in a longitudinal phase space rotation of the first plurality of charged particles, such as a counter-clockwise longitudinal phase space rotation of the first plurality of charged particles. The non-uniform acceleration experienced by the first plurality of charged particles due to the local distortion in the non-uniform electric field may be used to fully control the energy distribution of the first plurality of charged particles. The total acceleration of the first plurality of charged particles may depend on the acceleration due to the non-uniform electric field, and the acceleration due to the local distortion in the non-uniform electric field. The local distortion in the non-uniform electric field may be controlled by controlling at least one of the spatial distribution, total charge, location, mass and species of the second plurality of charged particles, by controlling the timing of adding, injecting or firing the second plurality of charged particles into the plasma, or by controlling the timing of creating the second plurality of charged particles in the plasma.

The properties of the second plurality of charged particles, such as the spatial distribution, total charge, location, mass and species of the second plurality of charged particles, the timing of adding, injecting or firing the second plurality of charged particles into the plasma, or the timing of creating the second plurality of charged particles in the plasma, may determine the local distortion in the non-uniform electric field. The particles of the first plurality of charged particles may experience different accelerations, although they may be accelerated in the same direction. The energy distribution of the first plurality of charged particles may be controlled by the total acceleration experienced by each particle in the first plurality of charged particles.

Different particles in the first plurality of charged particles may experience a different acceleration due to the non-uniform electric field. Different particles in the first plurality of charged particles may experience a different acceleration due to the local distortion in the non-uniform electric field. The local distortion required to accelerate the first plurality of charged particles such that the first plurality of charged particles have a particular energy distribution, which may be due to the different accelerations experiences by each particle in the first plurality of charged particles, may be determined by simulation, for example by simulating the properties of the second plurality of charged particles, such as at least one of the spatial distribution, total charge, location, mass and species of the second plurality of charged particles, by controlling the timing of adding, injecting or firing the second plurality of charged particles into the plasma, or by controlling the timing of creating the second plurality of charged particles in the plasma.

The local distortion in the non-uniform electric field, the properties of the second plurality of charged particles and/or the energy distribution of the first plurality of charged particles after acceleration may be determined by simulation, for example they may be determined or approximated by solving the plasma wave Poisson equation, optionally in 1D. This may allow the desired local distortion in the non-uniform electric field, such as flattening or reversing the gradient of the non-uniform accelerating electric field, to be determined. It may allow the spatial distribution, total charge, location, mass and species of the second plurality of charged particles, by controlling the timing of adding, injecting or firing the second plurality of charged particles into the plasma, or by controlling the timing of creating the second plurality of charged particles in the plasma, to be determined. The simulation may use the desired energy distribution of the first plurality of charged particles as a boundary condition. The simulation may use the initial properties, such as spatial distribution, total charge, location, mass and species of the first plurality of charged particles as input parameters. The simulation may use the properties of the plasma, such as species and plasma density as input parameters. The simulation may use plasma wave properties, such as wavelength, amplitude and/or propagation speed, as input parameters. The simulation may use properties of the laser beam or driving particle beam which is used to create the plasma wave as input parameters, such as laser beam intensity, repetition or pulse rate, wavelength, spot size, energy and power; and/or driving particle beam species, charge, energy distribution, spatial distribution, emittance and/or evolution. Plasma wave wavelength, amplitude and strength and/or propagation speed may be calculated from the laser beam or driving particle beam properties.

The 1D Poisson equation for an unloaded wake, which is a plasma wave without a second plurality of charged particles present, is:

$$k_p^{-2} \frac{\partial^2 \phi}{\partial \xi^2} = \frac{n_{drive}}{n_0} + \frac{1}{2(1+\phi)^2} - \frac{1}{2}$$

where $k_p$ is the plasma wavenumber, $\xi = z - v_p t$ is the co-moving coordinate (z is the coordinate in the laboratory frame, $v_p$ is the plasma wake phase velocity and t is the time), $n_{drive}$ is the (non-evolving) electron driver charge density, $n_0$ is the unperturbed plasma density and $\phi$ is the scaled electrostatic potential. While this equation describes electron beam driven plasma waves, similar equations describe plasma waves driven by positron or proton beams, where the main difference to the electron beam driven case is a reversed initial plasma electron trajectory due to the positive charge of positrons as well as of protons or ions, and plasma waves driven by longer wavelength laser pulses, where the propagation speed of the driver is given by the laser pulse group velocity.

The plasma wave Poisson equation in 1D for a loaded wake, which is a plasma wave with a second plurality of charged particles present such that $n_{load}$ is the (non-evolving) charge density of the second plurality of charged particles, is:

$$k_p^{-2} \frac{\partial^2 \phi}{\partial \xi^2} = \frac{n_{drive} + n_{load}}{n_0} + \frac{1}{2(1+\phi)^2} - \frac{1}{2}$$

The desired local distortion in the non-uniform electric field such that the first plurality of charged particles have the desired energy distribution may be determined by modelling the plasma wave Poisson equation in 1D.

The total acceleration experienced by all the electrons in the first plurality of charged particles due to the non-uniform electric field and due to the local distortion in the electric field, e.g. across the whole plasma, may be equal or within a threshold amount. The total acceleration experienced by the electrons in the first plurality of charged particles due to the non-uniform electric field and due to the local distortion in the electric field, e.g. across the whole plasma, may result in particles at the front of the first plurality of charged particles having higher energy than the particles at the back, or it may result in the particles at the back of the first plurality of charged particles having higher energy than the particles at the front, where the front of the first plurality of charged particles is in the direction of propagation of the first plurality of charged particles.

The first and/or second plurality of charged particles may comprise a group, bunch, collection, packet or beam of charged particles. The first and/or second plurality of charged particles may comprise at least one of electrons, positrons, protons and ions.

The non-uniform electric field may be created by the propagation of a plasma wave through the plasma. The plasma wave may be linear or non-linear. The non-uniform electric field may have a sinusoidal or sawtooth profile. For example, the plasma wave may be linear, e.g. when the (non-evolving) driving particle beam charge density is much smaller than the unperturbed plasma density ($n_{drive}/n_0 \ll 1$), and the non-uniform electric field may be sinusoidal in the direction of propagation of the plasma wave. The plasma wave may be quasi-linear, e.g. when the (non-evolving) driving particle beam charge density is approximately equal to, or of the same order as, the unperturbed plasma density ($n_{drive}/n_0 \approx 1$), or preferably non-linear or strongly non-linear, e.g. when the (non-evolving) driving particle beam charge density is much greater than the unperturbed plasma density ($n_{drive}/n_0 \gg 1$), and the non-uniform electric field may be sawtooth shaped in the direction of propagation of the plasma wave. The plasma wave may be linear, where the plasma electron oscillation, driven by the restoring force of the quasi-stationary plasma ions, is harmonic. The plasma wave may be non-linear, where the plasma electron oscillation is not harmonic. The non-uniform electric field may be created or provided in the blowout region of the plasma wave, such as in a non-linear plasma wave. The energy distribution of the first plurality of charged particles at the end of the accelerating phase or section of the plasma wave within the plasma may be controlled by controlling at least one of the spatial distribution, total charge, location, mass and species of the second plurality of charged particles, by controlling the timing of adding, injecting or firing the second plurality of charged particles into the plasma, or by controlling the timing of creating the second plurality of charged particles in the plasma. The energy distribution of the first plurality of charged particles may be controlled with a single-stage plasma accelerator. The non-uniform electric field may be large, of the order of tens of GV/m. The non-uniform electric field may range from −50 GV/m to 50 GV/m across a plasma wave wavelength, such as across a distance of 100 µm. The non-uniform electric field may be 3 or 4 orders of magnitude larger than electric fields found in conventional accelerators.

The non-uniform electric field or plasma wave may be created by a laser beam interacting with the plasma, such as a laser pulse, preferably a long-wavelength laser pulse, for example with a wavelength in the range of 1 to 20 µm. The laser pulse may be or comprise an intense laser pulse, for example with peak focus intensity of the order of $10^{18}$ W cm$^{-2}$, such as produced by a typical Ti:Sapphire high-power laser pulse with a central wavelength of ~800 nm. The wavelength of the laser may be sufficiently long to prevent complete ionisation of the involved plasma species, but may also provide large enough ponderomotive force to expel electrons rapidly out of the laser pulse trajectory and thus generate a plasma wave, preferably a strong plasma wave. Lasers with longer wavelengths may therefore need lower intensity as $I \propto E^2$ and may produce correspondingly lower peak values of the electric field E than lasers with shorter wavelengths in order to excite a sufficiently strong plasma wave. The ponderomotive force may scale quadratically with the laser pulse wavelength.

The non-uniform electric field or plasma wave may be created by a driving particle beam interacting with the plasma, such as an electron beam, positron beam, proton beam, ion beam or muon beam, preferably an intense and/or energetic electron beam, for example with currents of multi-kA, and/or driving particle beam charge densities larger, possibly much larger, than the plasma electron density, for example from a linear accelerator, such as a radiofrequency-based linac, a laser-wakefield accelerator, or a hybrid combination of both, in which the linac would generate an electron beam, and the laser-wakefield accelerator would accelerate the electron beam to higher energies. The laser-wakefield accelerator may be a single-stage or multi-stage laser wakefield accelerator. The driving particle beam may be spatially confined, or short, preferably having a dimension or length of the order of half of the plasma wave wavelength. The driving particle beam may be of high current and/or high charge density, such as kilo-Ampere current, for example such that the wake of the plasma wave is able to trap laser released charged particles, such as electrons. The driver particle beam may have a current of over 6 kA, which may be the typical threshold for achieving trapping. The driver particle beam current may be reduced by the addition of a plasma density downramp, where the plasma electron density may be reduced in the propagation direction of the plasma wave, which may allow a current of approximately 2 kA to be sufficient to drive a plasma wave which may allow for trapping of electrons released in the plasma. The driver particle beam may have a high repetition rate, e.g. up to kHz shot rates.

The plasma may comprise at least one low ionisation threshold component and at least one high ionisation threshold component. In the plasma, the high ionisation threshold component and low ionisation threshold component may exist in states in which the low ionisation threshold component is more easily ionised, or more easily further ionised, than the high ionisation threshold component. In the plasma, the high ionisation threshold component and low ionisation threshold component may exist in states in which the low ionisation threshold component requires less energy to eject an electron than the high ionisation threshold component. The low ionisation threshold component may comprise hydrogen or other elements, atoms or molecules with low ionization energies, such as alkali metals. The high ionisation component may comprise helium or a high atomic number element, such as krypton. The high ionisation component may be necessary to prevent the complete ionisation of the plasma during excitation of the plasma, for example during excitation of the plasma wave. Both the high ionisation component and the low ionisation component may comprise lithium. The high ionisation threshold component may be locally confined to a portion of the plasma, or distributed unevenly within the plasma. The densities of the low and high ionisation threshold components may be individually controlled. The low ionisation threshold component may be self-ionised by the same laser pulse or driver particle beam which creates the plasma wave, or the low ionisation threshold component may be separately pre-ionised by a separate excitation, such as another laser beam, or by discharges, arc jets, or similar. The low ionisation threshold component may be ionised in a controlled way, for example by the selective ionisation of the low threshold ionisation component without ionising the high threshold ionisation component, or spatially confining the ionisation of the low ionisation threshold component, for example by focusing a laser, which may create a plasma channel which is wider than the plasma wavelength, such as of the order of 100 μm wide in a plasma with an electron density of $n_0 \sim 10^{17}$ cm$^3$ and/or a long or elongate plasma channel, which may range from a few mm to meter scale in length. The low ionisation threshold component may be ionisable under conditions in which the high ionisation threshold component is not ionisable, or the high ionisation threshold component may only be ionised in small amounts, for example less than 10%, preferably less than 5%, more preferably less than 3%. In other words, the low ionization threshold component may be ionisable selectively from and/or independently to the high ionization threshold component. The plasma may have a plasma density $n_o$ of the order of $10^{17}$ cm$^{-3}$, which may result in peak accelerating electric fields of the order of 30 GV/m being produced.

The plasma wave may propagate in the low ionisation threshold component. The plasma wave wavelength may be small, for example of a few tens to a few thousands of μm, preferably in the range from 50 to 150 μm. The plasma wavelength may be large, for example 1 cm. The plasma wavelength may be in the range from 50 μm to 1 cm.

The non-uniform electric field may be non-uniform along the direction of propagation of the non-uniform electric field, i.e. the direction in which the first plurality of charged particles are accelerated.

The first plurality of charged particles may be injected or fired into the plasma. The first plurality of charged particles may be created in the plasma. For example, if the first plurality of charged particles comprises electrons, the electrons may be created by the further ionisation of the plasma ions. The ions of the plasma may be further ionised when the plasma wave is created or excited, when the non-uniform electric field is created or excited within the plasma, such as created or excited by a laser beam interacting with the plasma, such as a laser pulse, preferably a long-wavelength intense laser pulse, for example with a wavelength in the range of 1 to 20 μm, or else by a particle beam interacting with the plasma, such as an electron beam from a linear accelerator, a laser-wakefield accelerator, or a hybrid combination of both. The first plurality of charged particles may be created by further ionisation of the plasma ions, may be by the same laser pulse or driver particle beam which creates the plasma wave, or may be separately pre-ionised by a separate excitation, such as another laser beam, or by discharges, arc jets, or the like. The ions of the plasma may be further ionised by a second laser excitation, which may selectively further ionise a low ionisation threshold component of the plasma and not ionise a high ionisation threshold component of the plasma. The first plurality of charged particles may have a low total charge, such as a lower total charge than the second plurality of charged particles. The first plurality of charged particles may be bright, preferably very bright, or of ultrahigh 5D-brightness, where 5D-brightness may be defined by the current of the first plurality of charged particles divided by the normalised transverse emittance in both transverse directions, perpendicular to the propagation direction of the first plurality of charged particles. The first plurality of charged particles may be electrons created by the underdense photocathode Trojan Horse method. The first plurality of charged particles may be located such that they are in the trough of the non-uniform electric field, which may maximize the ability to trap the first plurality of charged particles. The first plurality of charged particles may be located at the back of a plasma wavelength.

The first plurality of charged particles may be accelerated to high energies, for example relativistic energies, such as in the range from a hundred or three hundred MeV up to 100 GeV or more over a distance of approximately a few cm to more than a meter. The first plurality of charged particles may propagate collinearly with the laser pulse or driver particle beam which creates the plasma wave. The first plurality of charged particles may be located at the back of the plasma wave, which may be 1 plasma wavelength behind, or less than 1 wavelength behind but more than half a wavelength behind, the front or head of the plasma wave. The first plurality of charged particles may have sufficient energy that the total charge of the second plurality of charged particles has no or little direct effect on the first plurality of charged particles. The first plurality of charged particles may have sufficient energy such that the total charge of the second plurality of charged particles has no or little direct effect on the first plurality of charged particles as the space charge force effects reduce as the energies of the first plurality of charged particles, such as accelerated electrons, increase, scaling with the electron energy Lorentz factor $\propto \gamma^2$, where $\gamma=(1-\beta^2)^{-1/2}$ and $\beta=v/c$, the ratio of particle energy and speed of light c in vacuum.

The second plurality of charged particles may be added, injected or fired into the plasma, or created within the plasma. At least one of the spatial distribution, total charge, location, mass and/or species of the second plurality of charged particles may be controlled or controllable. The timing of adding, injecting, creating and/or firing the second plurality of charged particles may be controlled or controllable. The local distortion in the non-uniform electric field may be controlled or controllable by changing the controlled or controllable properties of the second plurality of charged particles, such as the properties indicated above. The second plurality of charged particles may be electrons created by the underdense photocathode Trojan Horse method. The second plurality of charged particles may be created within the plasma by ionisation of plasma ions, for example by the laser excitation of plasma ions, which may be a higher or lower energy laser than that used to create the first plurality of charged particles. The laser pulse properties, such as the energy, spot size and intensity, may be controlled or controllable to control at least one of the controlled or controllable properties of the second plurality of charged particles, such as the spatial distribution, total charge, location, and/or timing of creation of the second plurality of charged particles. The laser pulse may co-propagate with the first plurality of charged particles or may be at an angle, such as a determined or predetermined angle, to the direction of travel of the first plurality of charged particles. The second plurality of charged particles may have a higher total charge than the first plurality of charged particles, such as 1 or 2 magnitudes greater total charge. The second plurality of charged particles may overload, beam load and/or deform the plasma wave. The position at which to add, inject, fire, or create the second plurality of charged particles may be the position at which the maximum charge can be obtained. The second plurality of charged particles may propagate collinearly with the first plurality of charged particles. The second plurality of charged particles may be located such that they produce a local distortion near the trough of the non-uniform electric field. The second plurality of charged particles may be located at the back of the same plasma wave bucket as the first plurality of charged particles, where the plasma wave bucket is the region of the plasma wave in which the trough in the electric field is located. The second plurality of charged particles may be located such that it spatially overlaps with the first plurality of charged particles.

According to a second aspect of the invention there is provided a plasma accelerator configured for use in the method of the first aspect of the present invention. Features of the first aspect are equally applicable to the second aspect.

The plasma accelerator may comprise a plasma generator, such as a heater or an electromagnetic field generator. The plasma generator may be configured to create or maintain the plasma.

The plasma accelerator may comprise a first excitation source, which may create the non-uniform electric field and/or the first plurality of charged particles within the plasma. The first excitation source may be a laser. The first excitation source may ionise the low ionisation threshold component of the plasma but may not ionise the high ionisation threshold component of the plasma. The first excitation source may comprise a particle injector for injecting, firing or adding the charged particles of the first plurality of charged particles into the plasma. The particle injector may comprise a first transport system. The first transport system may transport the first plurality of charged particles and/or the driver particle beam into the plasma.

The plasma accelerator may comprise a second excitation source, which may create the second plurality of charged particles within the plasma. The second excitation source may be a laser or lasers. The second excitation source may be configured to add a second plurality of particles to the plasma, e.g. such that the second plurality of charged particles propagate through the plasma. The second plurality of charged particles may create a local distortion in the non-uniform electric field experienced by the accelerating first plurality of charged particles. The local distortion in the non-uniform electric field may propagate through the plasma with the accelerating first plurality of charged particles. The local distortion in the non-uniform electric field may be used to accelerate at least some or all of the first plurality of charged particles in the direction of propagation of the region of non-uniform electric field.

The plasma accelerator may comprise a second transport system. The second transport system may collect the first plurality of charged particles from the plasma, which may be ultrabright charged particles, preferably 6D-brightness electrons. For example, the 6D brightness is defined here as:

$$b_6 = \frac{I_p}{\varepsilon_n^2 \frac{\delta W}{0.1\% \ W}}$$

where $I_p$ is the electron beam current, $\varepsilon_n$ is the normalised emittance in both transverse directions, and $\delta W/W$ is the relative energy spread of the electron beam. The second transport system may be configured to remove the driver particle beam and the second plurality of charged particles from the first plurality of charged particles, for example by magnetic separation, e.g. in a restriction, bend or chicane.

The first and/or second transport systems may comprise permanent magnets and/or electromagnets, which may be used to capture, focus and/or condition the first plurality of charged particles, the second plurality of charged particles, or the driver particle beam. The magnets may be arranged in a quadrupole configuration.

The plasma accelerator may comprise a controller, such as an external controller, which may control the first and/or second excitation sources, e.g. to control when the first and/or second excitation sources interact with the plasma. The controller may be configured to control the location and/or time at which the second plurality of charged particles are fired, injected, added or created in the plasma. The controller may be configured to control the first and/or second excitation sources so as to at least partially control the controlled or controllable properties of the first and/or second plurality of charged particles.

For example, the controller may be configured to control the creation or excitation of the plasma wave, for example by controlling the first excitation source, to control the non-uniform electric field, to accelerate the first plurality of charged particles in the direction of propagation of the region of non-uniform electric field.

The controller may be configured to control the second excitation source to, once the first plurality of particles have propagated part-way through the plasma,
 add a second plurality of charged particles to the plasma, such that;
   the second plurality of charged particles propagates through the plasma, the second plurality of charged particles create a local distortion in the non-uniform electric field experienced by the accelerating first plurality of charged particles, and the local distortion in the non-uniform electric field propagates through the plasma with the accelerating first plurality of charged particles; and using the local distortion in the non-uniform electric field to accelerate at least some or all of the first plurality of charged particles in the direction of propagation of the region of non-uniform electric field.

The first plurality of charged particles may have propagated 10% to 90% of the way through the plasma, for example 30% to 70% of the way through the plasma, preferably 40% to 60% of the way through the plasma, when the second plurality of charged particles are added to the plasma. It will be appreciated that the actual distance the first plurality of charged particles have propagated through the plasma at the point when the second plurality of charged particles are added to the plasma may vary depending on the experimental conditions, the dispersion of the first plurality of charged particles, such as the energy distribution and/or the spatial distribution of the first plurality of charged particles, and the desired dispersion of the first plurality of charged particles, such as the desired energy distribution and/or the desired spatial distribution of the first plurality of charged particles.

According to a third aspect of the present invention there is an electromagnetic radiation source, comprising a plasma accelerator according to the second aspect of the present invention. The electromagnetic radiation source may comprise an undulator.

The undulator may comprise a series of permanent or electro magnets. The accelerated charged particles, such as accelerated electrons, from the plasma accelerator may travel through the undulator. The magnets of the undulator may be arranged such that the accelerated charged particles undulate in the magnetic field of the magnets, for example the charged particles may move in a sinusoidal path with the magnetic fields of the undulator. The charged particles may emit light as their direction is changed by the magnetic field of the undulator. The undulator may comprise mirrors, between which the emitted light may propagate or resonate.

The electromagnetic radiation source may be an advanced light source, for example an advanced light source of high intensity. The electromagnetic radiation source may be, comprise or be comprised in a free-electron laser. The free-electron laser may be a broadband free-electron laser, e.g. using a first plurality of charged particles with a wide energy distribution, for example with an energy spread of ~0.1%. The broadband free-electron laser may be configured for use in absorption spectroscopy, crystallography, Raman spectroscopy, anomalous diffraction of x-ray transport lines and/or the like. The free-electron laser may be a hard x-ray source, e.g. using a first plurality of charged particles with a narrow energy distribution, for example an energy spread of ~0.01%. The free-electron-laser may be configured for use in a tapered mode, such that the energy loss due to emission of radiation when the emitted photon field slips forward with respect to the first plurality of charged particles is compensated by an adjusted energy chirp, e.g. a higher electron energy in the front of the first plurality of charged particles than at the back of the first plurality of charged particles.

The electromagnetic radiation source may be an inverse Compton scattering light source or ion channel laser. The inverse Compton scattering light source or ion channel lasing may take place within the plasma, optionally without the extraction of the first plurality of charged particles from the plasma. The ion channel laser may generate coherent photon beams inside the plasma, e.g. via oscillations, such as betatron oscillations, of the first plurality of charged particles.

The electromagnetic radiation source may comprise a conditioning system, which may be arranged to condition the first plurality of charged particles from the plasma accelerator for use in the undulator.

The undulator may be configured to convert the first plurality of charged particles into electromagnetic radiation, such as high brightness electromagnetic radiation, for example up to the hard x-ray and gamma-ray regime.

It should be understood that the individual features and/or combinations of features defined above in accordance with any aspect of the present invention or below in relation to any specific embodiment of the invention may be utilised, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE FIGURES

At least one embodiment of the invention will not be described, by way of example only, with reference to the accompanying drawings, in which:

FIG. 1b illustrates a first phase of operation of the plasma accelerator of FIG. 1a;

DETAILED DESCRIPTION OF VARIOUS EMBODIMENTS

Throughout the following description, identical reference numerals will be used to identify identical parts.

Figure 1A:
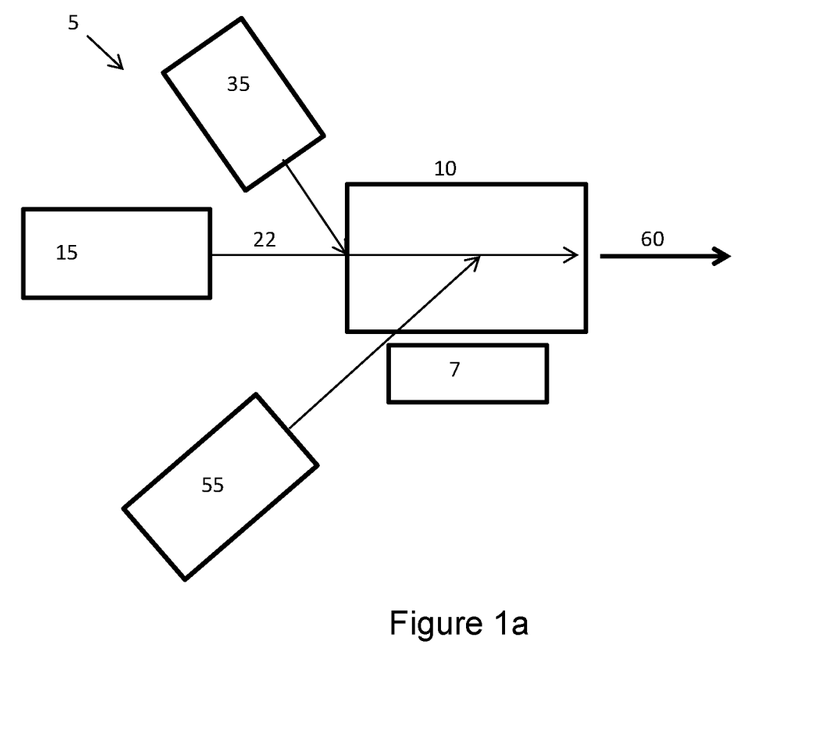
FIG. 1a shows a schematic of a plasma accelerator suitable for use with the present invention.
Figure 1B:
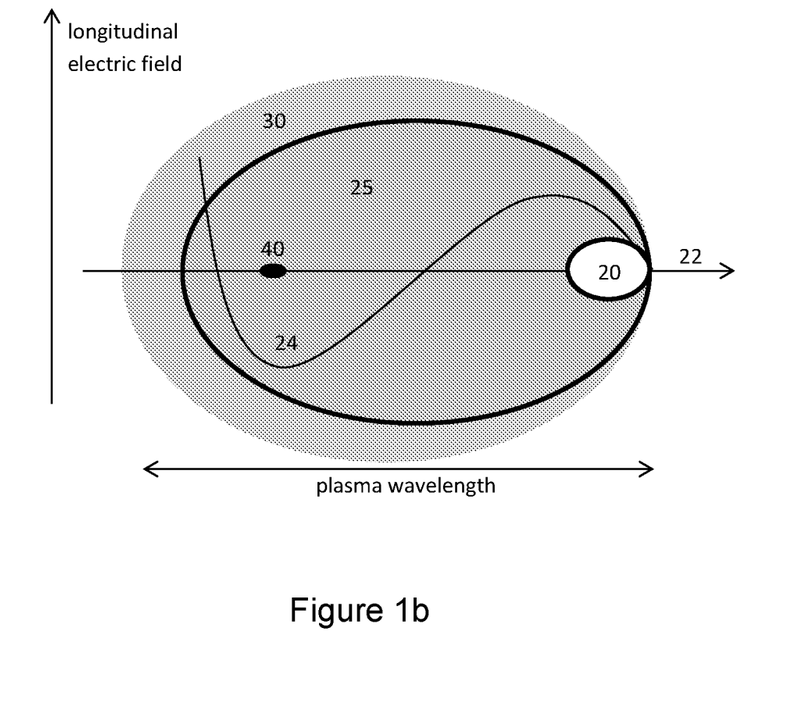

Embodiments of the present invention relate to plasma-based accelerators. Plasma based accelerators can provide very high energy gains and can allow an increase of electron 5D-brightness by orders of magnitude. A plasma accelerator suitable for use with the present invention is shown in FIG. 1a. The accelerator 5 comprises a chamber 10 for containing the plasma. A medium from which the plasma is formed is present in the chamber 10. A plasma generator 7, such as a heater or an electromagnetic field generator, creates and maintains the plasma in the chamber 10. The accelerator 5 comprises one or more plasma drivers 15, such as lasers, electron beam generators, proton beam generators or the like. The plasma drivers 15 are operable to provide an excitation beam 20 along a beam axis 22 through the medium in the chamber 10, thereby forming a plasma wave within the plasma. In this way, the plasma drivers are operable to excite a longitudinal plasma wave in the medium. As shown in FIG. 1b, the excitation beam 20 forces a bunch of negatively charged electrons 30 away from the beam axis 22, while the positively charged ions with higher mass remain relatively stationary, resulting in a plasma "blowout" 25. Once the excitation beam 20 has passed, the negatively charged electrons 30 are attracted to the back of the blowout region 25 by the positively charged ions, resulting in excess negative charge at the back of the blowout region 25. The spatial distribution of the negatively charged electrons 30 and the positively charged ions in and around the blowout region 25 results in a non-uniform electric field 24 within the blowout region 25 which propagates through the plasma behind the excitation beam 20.

A first plurality of charged particles 40 may be added to the plasma or created in the plasma. For example, the first plurality of charged particles 40 may be electrons which are created by the ionisation of the plasma by the excitation beam 20. Alternatively, the first plurality of charged particles 40 may be added to the plasma by a first excitation source 35, for example an electron beam which adds electrons to the plasma, or a laser pulse which further ionises the plasma to release free electrons within the plasma. If the first plurality of charged particles 40 are negatively charged, such as electrons, and they are located in the trough of the non-uniform electric field 24, near the back of the blowout region 25, they will experience an acceleration due to the non-uniform electric field 24 along the beam axis 22 behind the excitation beam 20. As the electric field 24 is non-uniform, some of the electrons 40 will experience a high force, and hence a larger acceleration, then other electrons 40. This will broaden the energy distribution of the electrons 40.

Figure 1C:
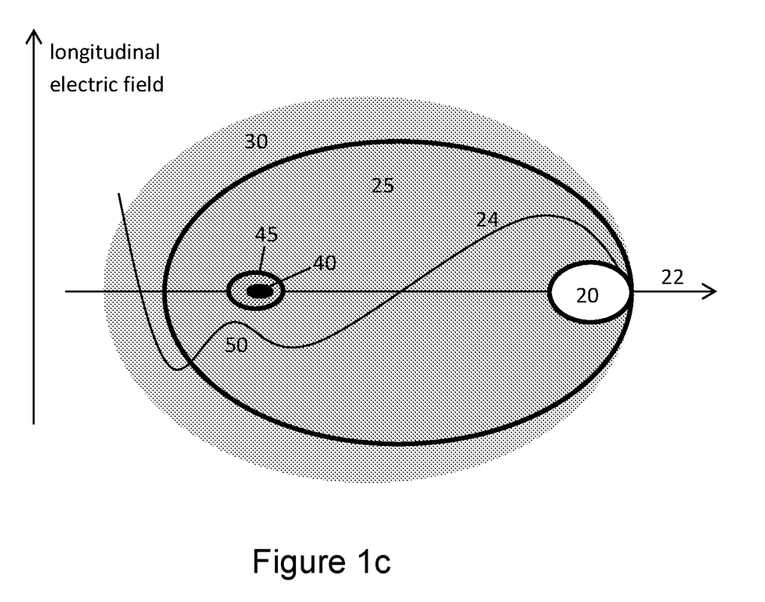
FIG. 1c illustrates a second phase of operation of the plasma accelerator of FIG. 1c.

Once the electrons 24 have moved part-way through the plasma, and have reached relativistic speeds, a second plurality of charged particles 45, such as a second group of electrons 45, are added to the plasma, as shown in FIG. 1c. The second group of electrons 45 are added to the plasma by a second excitation source 55, for example, which may inject electrons into the plasma, or may be a laser which further ionises the plasma. The second group of electrons 45 spatially overlap with the electrons 40. The charge of the second group of electrons 45 will affect the non-uniform electric field 24, creating a local distortion 50 in the non-uniform electric field 24. The position and total charge of the second group of electrons 45 will determine the position and size of the local distortion 50 in the non-uniform electric field 24.

The local distortion 50 in the non-uniform electric field 24 will accelerate different electrons 40 by different amounts. By carefully choosing the location and time at which the second group of electrons 45 are added, and the total charge of the second group of electrons 45, it is possible to control when, where, and to what extent the local distortion 50 modifies the non-uniform electric field 24. It is therefore possible to control how the local distortion 50 in the non-uniform electric field will accelerate the first group of electrons 40. For example, it is possible to narrow the broadened energy distribution of the electrons 40 by accelerating the slower electrons more than the faster electrons. The final energy distribution of the accelerated electrons 60 leaving the plasma accelerator 5 can therefore be controlled by controlling the local distortion 50 in the non-uniform electric field 24.

In a plasma blowout regime, where strong nonlinear plasma waves are generated, the on-axis longitudinal non-uniform electric field 24 is linear and has a sawtooth shape, implying that the electric field gradient is of the order of ~0.3 MV/μm for a plasma wavelength of $\lambda_p$~100 μm (at a plasma electron density of $n_0$~$10^{17}$ cm$^{-3}$). Hence electrons at the tail of the accelerated bunch will accumulate a correspondingly higher energy than electrons at the head of the bunch.

US 2014 0131594 A1 describes how to produce a high 5D-brightness electron beam via the so-called underdense photocathode Trojan Horse (TH) method, which can optionally be used as the first plurality of charged particles e.g. electrons 40. In this method, which may be used in embodiments of the present invention, an electron beam is produced in a hybrid accelerator driven by a strong electron beam, by having a synchronized laser beam co-propagating (or propagating at an angle) and then releasing an electron beam directly within the plasma blowout.

As a result of the above method, the electrons are ultracold, and highly tuneable by tuning the releasing laser pulse properties and the high ionisation threshold medium density. The electrons are ultracold, because the transverse momentum is orders of magnitude smaller than in other laser-plasma-acceleration methods. For example, in the TH method, the laser pulse only has to release the electrons, not expel them. The intensity (I) of the beam, $I=2a_0^2 \varepsilon_0 c[\pi m_e c^2/(e\lambda)]^2 \approx a_0^2/(\lambda^2[\mu m^2]) \times 1.37 \times 10^{18}$ W/cm$^2$ ($\varepsilon_0$ is the permittivity of free space, c is the speed of light, $m_e$ and e are the mass and charge of an electron, and $a_0$ and $\lambda$ are the normalised intensity and central wavelength of the laser pulse), required to release electrons can be as low as $a_0$<0.01 when using a short wavelength laser, and therefore the transverse residual momentum $p_x$~$a_0$ of the electrons even in the direction of the laser polarization is orders of magnitude smaller than with state-of-the-art methods. The transverse normalised emittances in both transverse directions are given by $\varepsilon_{n,x}=(\langle x^2 \rangle_N \langle p_x^2 \rangle_N - \langle xp_x \rangle_N^2)^{1/2}/(m_e c)$ and $\varepsilon_{n,y}=(\langle y^2 \rangle_N \langle p_y^2 \rangle_N - \langle xp_y \rangle_N^2)^{1/2}/(m_e c)$ where x, $p_x$, y, p, are the transverse off-axis coordinates and momenta, respectively, and $\langle \rangle_N$ denotes the average over all N released electrons from the photocathode release, and shows how small transverse momenta contribute to the small emittance. The released high ionisation threshold electrons can be trapped if they accelerate quickly enough in the wakefield such that they catch up with the plasma wake. A physical picture for the trapping can be formulated making use of the electrostatic plasma wake potential Ψ. A trapping condition can then be derived by defining the trapping potential $\Phi=[\Psi_{max}-\Psi]/[(m_e c^2/e)(1-\gamma_{ph}^{-1})]$, where $\gamma_{ph}$ is the speed of the plasma wake and $\Psi_{max}$ denotes the maximum electrostatic potential. If Φ<−1, trapping can be achieved. In other words, trapping is easiest if the electrons are released in the middle of the plasma wake at the zero-crossing of the longitudinal electric field. In this case, the released electrons sample all of the accelerating part of the plasma wake until they are trapped at the end of the plasma wake. Since the accelerating electric field is linear in nonlinear plasma waves, the potential has a quadratic curvature, i.e. the electric field strength is the (negative) gradient of the electrostatic potential of the wake. This curvature means that the released electrons will always bunch together, such that the generated length of the first plurality of charged particles is always shorter than the length of the first plurality of charged particles when first added to the plasma i.e. they become less spatially distributed. The current $I_p$ of the produced first plurality of charged particles therefore can be very high. As a consequence of the high current, and the low emittance, the so called 5D-brightness $b_5 \approx 2 \, I_p/\varepsilon_n^2$ can therefore exceed values of $b_5 > 10^{20}$ Am$^{-2}$ rad$^{-2}$. Emittance, current and brightness are known as a key decisive performance indicator for various applications, for example light sources based on inverse Compton scattering light source or free-electron lasers. For example, the 1D-gain length $L_{1D} \sim b^{-1/3}$ and, according to the Pellegrini criterion, the minimum theoretical FEL wavelength $\lambda_{min} \approx 4\pi\varepsilon_n/\gamma$, where $\gamma$ is the electron source energy in units of rest energy $m_e c^2$. This means that both the emittance and brightness that can be reached by the Trojan Horse mechanism is crucial for high performance FEL operation.

However, the energy spread of the produced witness electron bunches is also very important. The (slice) energy spread $\delta W/W$ should be smaller than the FEL Pierce parameter $\rho_{FEL}$. In very simple words, the coherent emission in the FEL requires low emittance, which defines the transverse expansion of the electron beam, but also low energy spread, which defines the microbunching efficiency and photon gain. The ultrahigh gradients of the plasma accelerator contradict the energy spread ($\delta W/W$) requirement, $\delta W/W < \rho_{FEL}$. A key question therefore is how to produce ultrahigh electron 5D-brightness $b_5$, and to combine it with low energy spread.

It is known that if the total charge of the first plurality of charged particles is sufficiently high, the first plurality of charged particles will distort the electric field in the plasma wave. However, if this is done it is not possible to create high brightness beams using the underdense photocathode Trojan Horse method. Generally, the emittance from a plasma accelerator is influenced by the transverse momentum of the charged particles, such as electrons, by betatron phase mixing, and by Coulomb space charge forces.

The present invention is able to create high brightness beams using the underdense photocathode Trojan Horse (TH) method described above, but modified by providing a second plurality of charged particles that create a local distortion in the non-uniform electric field, which can be used to control or reduce the energy spread distribution of the first plurality of charged particles. The use of a second plurality of charged particles to create the local distortion in the non-uniform electric field allows for bright beams of charged particles such as electrons to be created which have a controlled energy distribution, such as a narrow energy distribution, as the production of the ultrabright first plurality of charged particles is decoupled from the energy spread control process.

To determine what local distortion in the non-uniform electric field is needed to continue to accelerate the first plurality of charged particles such that they have the desired energy distribution, the properties of the system can be simulated. For example, the plasma wave Poisson equation in 1D can be solved to approximate the amount of charge and current profile of the second plurality of charged particles that are required to create the desired local distortion in the non-uniform electric field, which will result in the first plurality of charged particles having the desired energy distribution. The simulation may use the 1D Poisson equation to determine the required properties of the second plurality of charged particles. An unloaded wake is a plasma wave which does not have a second plurality of charged particles present. The 1D Poisson equation for an unloaded wake is:

$$k_p^{-2} \frac{\partial^2 \phi}{\partial \xi^2} = \frac{n_{drive}}{n_0} + \frac{1}{2(1+\phi)^2} - \frac{1}{2}$$

where $k_p$ is the plasma wavenumber, $\xi = z - v_p t$ is the co-moving coordinate (z is the coordinate in the laboratory frame, $v_p$ is the plasma wake phase velocity and t is the time), $n_{drive}$ is the (nonevolving) electron driver charge density, $n_0$ is the unperturbed plasma density and $\phi$ is the scaled electrostatic potential. The ultrahigh quality first plurality of charged particles which is then produced in this plasma wake via the underdense photocathode mechanism does not change this constellation significantly, which is an inherent feature because otherwise the then non-negligible space-charge forces would not only load and distort the plasma wakefields, but would also have detrimental effect on the witness bunch quality. In order to load the wake and to change the accelerating electric field, the second plurality of charged particles $n_{load}$ is added via the underdense photocathode mechanism such that $$k_p^{-2} \frac{\partial^2 \phi}{\partial \xi^2} = \frac{n_{drive} + n_{load}}{n_0} + \frac{1}{2(1+\phi)^2} - \frac{1}{2}$$

Figure 2:
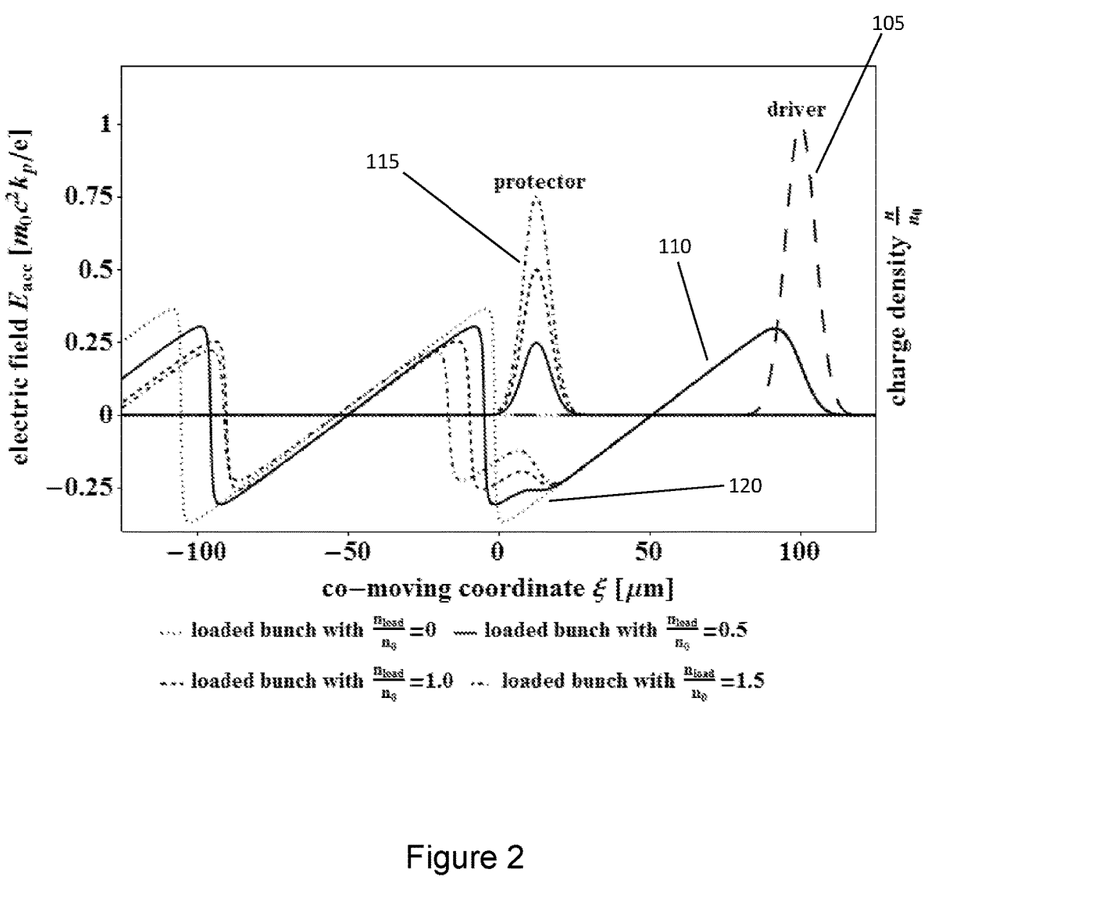
FIG. 2 shows local distortion in the non-uniform electric due to the second plurality of charged particles.
Figure 3:
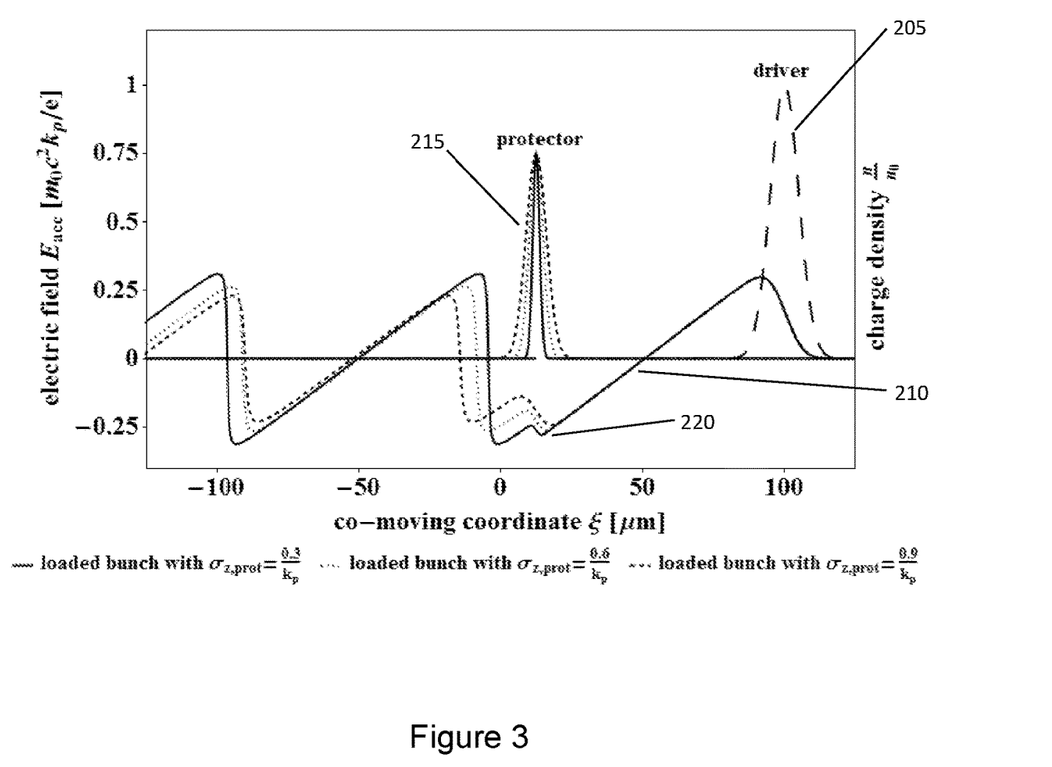
FIG. 3 shows local distortion in the non-uniform electric due to the second plurality of charged particles.

As a general rule, if one operates in one and the same plasma stage with one and the same gas mix, one can achieve higher released charge and higher charge density by increasing the underdense photocathode laser intensity and/or by increasing its Rayleigh length. Both factors will increase the volume of high ionisation threshold component which will be ionized, which results in strongly increased released charge and charge density. FIGS. 2 and 3 show different solutions to this 1D representation of the problem. As the non-uniform electric fields and the local distortion in the non-uniform electric fields can be calculated, it is possible to determine the energy distribution of the first plurality of charged particles after acceleration of the first plurality of charged particles within the plasma. It is therefore possible to work backwards, setting the desired energy distribution of the first plurality of charged particles as a boundary condition in the simulation to determine the required properties of the second plurality of charged particles required to create the local distortion in the non-uniform electric field which will result in the desired energy distribution.

FIG. 2 shows how a second plurality of charged particles 115 create a local distortion 120 in the longitudinal electric field 110 of a plasma wave.

A driver particle beam 105 is propagating to the right, and is used to create a plasma wave within the plasma. In the absence of a second plurality of charged particles 115, the plasma wave has a longitudinal sawtooth electric field 110. When a second plurality of charged particles 115 is added to the plasma, the second plurality of charged particles 115 cause a local distortion 120 in the longitudinal electric field 110 of the plasma wave. As the total charge of the second plurality of charged particles 115 increases, the local distortion 120 in the longitudinal electric field 110 increases in magnitude. When the second plurality of charged particles 115 are negatively charged, the gradient of the electric field 110 at the local distortion 120 decreases from positive values, to zero, to negative values, at the longitudinal position of the second plurality of charged particles, as the total charge of the second plurality of charged particles 115 increases. When the density of charged particles $n_{load}$ in the second plurality of charged particles 115 is equal to half the plasma density $n_0$, the local distortion 120 in the longitudinal electric field 110 has an approximately flat region, i.e. the electric field 110 is constant at the local distortion 120, which occurs at the longitudinal position of the second plurality of charged particles 115.

The first plurality of charged particles (not shown) is generally located in the second part of the plasma wave, at the back of the plasma wave, furthest from the driver particle beam, where the longitudinal electric field is accelerating, i.e. between 4=0-50 μm, where ξ is a coordinate propagating through the plasma with the first plurality of charged particles, found by ξ=z-$v_p$t, where z is the coordinate in the laboratory frame, $v_p$ is the plasma wave velocity and t is the time. As an example, in FIG. 2 the first plurality of charged particles is located at ξ×18 μm, and has a duration of approximately 2 μm. The second plurality of charged particles are released by an underdense photocathode laser pulse with approximately the same position of the ionization front in the co-moving frame as the first plurality of charged particles. This laser pulse, as well as the first plurality of charged particles, can release the charges either in a co-moving geometry, at an arbitrary angle, or by various combinations of overlapping laser pulses and the superposition of their oscillating fields and the resulting ionization rates.

Note that in this 1D simplification, space charge forces of the second plurality of charged particles during its formation process are not included. In practice, the length and peak charge density of the second plurality of charged particles are weakly coupled, because an increased charge release will not only distort the fields, but will also change the trapping positions. In order to set the desired working point for the application, 3D particle-in-cell simulations are carried through to take into account space charge and various nonlinear and dynamic effects.

FIG. 3 shows how changes in the second plurality of charged particles 215 can be used to change the extent of the local distortion 220 in the longitudinal electric field 210 of a plasma wave.

As in FIG. 2, the particle driver beam 205 is propagating to the right. When the peak density of the second plurality of charged particles 215 remains constant, but the spatial longitudinal extent of the second plurality of charged particles changes, so too does the longitudinal extent of the local distortion 220 in the longitudinal electric field 210 of the plasma wave. As the peak density of the second plurality of charged particles 215 remains the same but the total charge decreases, the longitudinal extend of the local distortion 220 in the longitudinal electric field 210 become shorter.

As an example of a 3D particle-in-a-cell simulation, lithium vapour is used to provide both the low ionisation threshold component and the high ionisation threshold component. This is an alternative to using hydrogen and helium respectively as the low ionisation threshold component and the high ionisation threshold component with the advantage of reduced dark current (uncontrollable self-injection of electrons in the plasma wave) at high plasma densities due to a substantially higher ionization threshold of $Li^+$ when compared to neutral He. Higher plasma densities are easier to model with particle-in-cell simulations, especially in the 3D case, because the simulation box can then be made much smaller. The plasma wave is produced in pre-ionised lithium with a plasma wavelength of ($\lambda_p$=100 μm), and the peak accelerating fields amount to $E_{peak}$~40 GV/m. The first underdense photocathode laser pulse, where underdense means that the laser pulse can propagate through plasma without being reflected, with a pulse duration of $\tau_{0,witness}$=25 fs is focused to spot size of $w_{0,witness}$=7 μm at a normalized intensity value of $a_{0,witness}$=0.1, releasing a copious amount of electrons from further ionization of lithium from the $Li^+$ to $Li^{2+}$ state, yielding a first plurality of charged particles with a 5D-brightness of $b_5$≈2×$10^{18}$ $Am^{-2}$ $rad^{-2}$ after ~1.6 cm of acceleration, ~5 pC of charge and an energy of W~500 MeV. At this point, the first plurality of charged particles is of ultrahigh quality and is relativistically stable. Now, the second plurality of charged particles is produced with a second, stronger laser pulse of significantly higher intensity $a_{0,protector}$=0.11, spot size $w_{0,protector}$=10 μm, and pulse duration $\tau_{0,protector}$=80 fs. This protector bunch has a charge of ~pC and is sufficient to create a local distortion in the non-uniform electric field which reverses the non-uniform electric accelerating field over the whole length of the first plurality of charged particles. Hence, the energy distribution of the first plurality of charged particles will be reduced, or dechirped, in the second phase of the acceleration due to the local distortion in the non-uniform electric field. 3D particle-in-cell simulations with numerical Cherenkov effects show that the r.m.s. energy spread before dechirping amounts to a correlated energy spread of $\delta W_{rms}$≈6.36 MeV and with an extremely negative chirp. After the dechirping process, at a position of ≈2.5 cm, the correlated energy spread is reduced to $\delta W_{rms}$≈2.56 MeV in this example, and the energy chirp is strongly reduced. To further rotate the longitudinal phase space and to overcompensate the chirp, the acceleration in this configuration just needs to continue.

Figure 4:
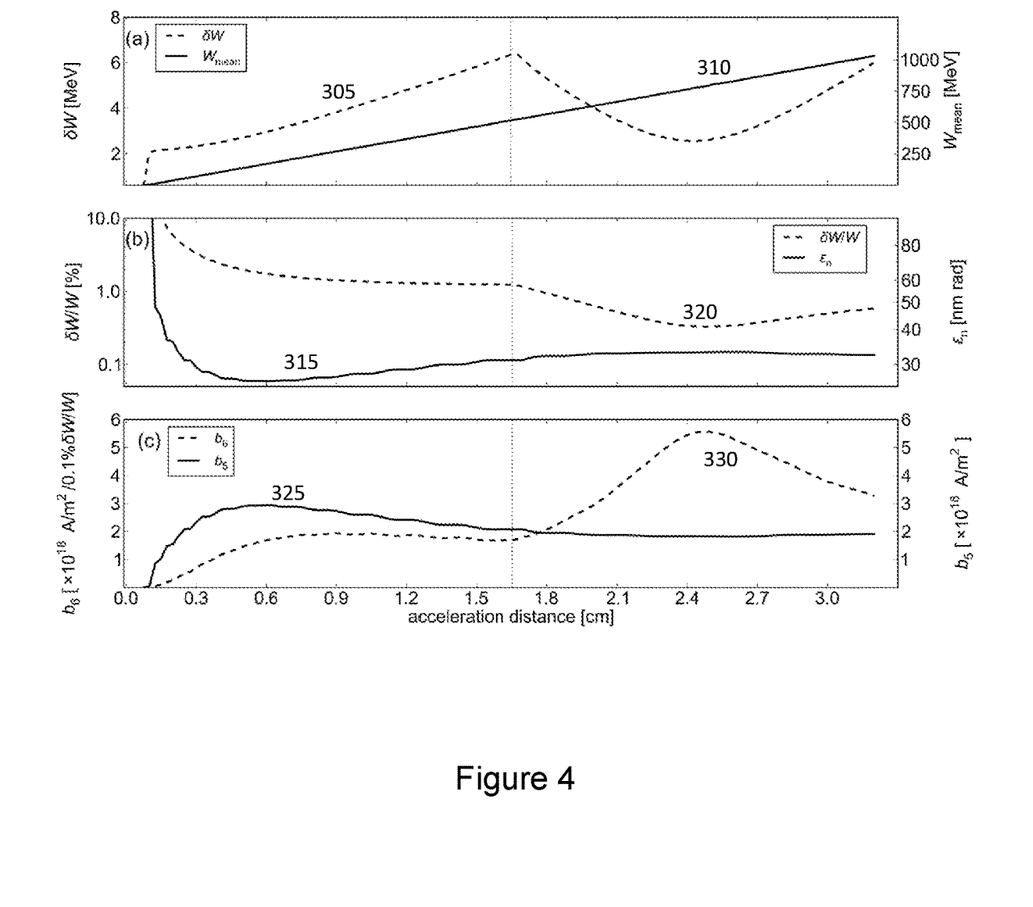
FIG. 4 shows variation in the properties of the first plurality of charged particles as they propagate through the plasma.

FIG. 4 shows the evolution of the first plurality of charged particles energy spread 305 $\delta W_{rms}$, relative energy spread 320 $\delta W_{rms}$/W, normalized emittance 315 $\varepsilon_{n,x}$, 5D-brightness 325 $b_5$ and 6D-brightness 330 $b_6$, here defined as $b_6$=$b_5$/ 0.1% $\delta W/W$, where $\delta W/W$ is the relative energy spread. The energy and absolute energy spread increase up to a propagation and acceleration distance of 1.6 cm in this example, and the relative energy spread decreases due to the increasing mean energy 310 W. At 1.6 cm, the second plurality of charged particles are released and reverse the local accelerating field by creating the local distortion in the non-uniform electric field. While the first plurality of charged particles continues to be accelerated, the energy chirp and energy spread 305 is reduced substantially. The relative energy spread 320 decreases strongly and reaches values as low as 0.03% at z≈2.5 cm. The corresponding y-axis in the figure is plotted in logarithmic scaling. This reduction of relative energy spread 320 is a key result of the present invention and is crucially important, because this facilitates going below the limit of the Pierce parameter already at comparably low energies such as those in the free-electron lasers, where sub-GeV electron energies are reached. This is suitable to enable strong FEL gain. The 6D-brightness 330 reaches a maximum at the point of lowest energy spread 320, reaching values as high as $b_6$≈5×$10^{18}$ $Am^{-2}$ $rad^{-2}$/0.1% $\delta W/W$. After reaching this optimum point, the further rotation in longitudinal phase space of the first plurality of charged particles once again reduces the 6D-brightness 330 $b_6$.

This is the optimum point of extraction from the plasma stage for key applications such as the FEL. The additional advantage of low energy spread 305 is that the (5D) brightness 325 can be maintained during extraction, while chromatic effects and different focusing forces in general make extraction of a plurality of charged particles with large energy distributions, or chirps, from the plasma very difficult and compromise the quality of the first plurality of charged particles. A natural by-product of the scheme is that the high-quality first plurality of charged particles is spatially overlapped by the second plurality of charged particles. However, the electron energy of the second plurality of charged particles is far less than the first plurality of charged particles, because the second plurality of charged particles are produced much later during the acceleration and samples the same accelerating fields. The second plurality of charged particles can therefore easily be separated from the first plurality of charged particles, for example using a magnetic bend or chicane, or in a focusing set of magnets, which may be used to capture and transport the first plurality of charged particles immediately after the plasma stage.

The first plurality of charged particles can be used as light sources, such as free-electron lasers, inverse Compton scattering (ICS) light source or ion channel lasers (ICL). The inverse Compton scattering light source and the ion channel laser light source can take place within the plasma stage, and do not necessarily require extraction from the plasma.

ICS is a well-known process that allows the generation of highly energetic photon pulses from the x-ray up to the hard γ-ray regime, including multi-MeV photons. It relies on scattering of relativistic charged particles with laser photons that will eventually Doppler-shift the photons' energies by a factor of $E_{ICS} \propto \gamma^2 E_i$, where γ is the Lorentz-factor of the charged particles, and $E_i$ is the incoming laser photon energy. To realise the inverse Compton Scattering light source according to the present invention, the ultralow emittance charged particle beam is scattered with an intense laser pulse at an arbitrary angle. This can explicitly take place within the plasma to harvest the high beam quality and avoid beam degradation at the plasma's exit. The generated high energy (hard) photon pulse will be emitted on a narrow cone with an opening angle 1/γ centred on the charged particle beam propagation axis and thus be highly directed. Those hard and directed photon pulses are, for example, highly useful to investigate, excite, or exploit nuclear physics and for non-destructive imaging or scanning applications.

However, e.g. nuclear resonance levels are typically very narrow, which requires the photon pulses have as narrow a spectral bandwidth as possible in order to reliably trigger the desired physics and/or to improve signal-to-noise ratios in applications. The relevant on-axis spectral bandwidth $\delta E_{ICS}/E_{ICS}$ depends on the charged particle beam's divergence $\sigma_\theta$ and couples strongly with its Lorentz factor:

$$\delta E_{ICS}/E_{ICS} \approx (\gamma \sigma_\theta)^2/4$$

The low emittance of the first plurality of charged particles is crucial for narrow bandwidth because it implies an ultralow divergence $\sigma_\theta \propto \epsilon_n \propto a_0$ as described above and enables high scattered photon energies without significant broadening. To avoid the latter, the charged particle beam is required to diverge on the order of $\sigma_\theta < 0.1$ mrad.

The charged particle beam energy spread has a linear contribution to the photon bandwidth $$\delta E_{ICS}/E_{ICS} \approx 2 \, \delta W/W$$

and the charged particle beam energy spread is significantly improved by the present invention.

Due to the inherent divergence of the charged particle beam on the order of 0.1 mrad and the decreased energy spread to ~0.03% levels, the resulting photon pulses are extremely monochromatic and allow for bandwidths in the sub-%-range on axis even for MeV photons, which represents an enormous reduction of an order of magnitude compared to state-of-the art plasma-based ICS sources. Therefore, the first plurality of charged particles as described in the present invention enables unprecedented high photon pulse quality and improved or novel applications.

In the ICL, the undulating trajectories are forced by the ion channel itself. If the preionised plasma channel is narrow enough, clearly when the plasma electron wavelength is larger than the width of the preionised channel, the plasma electrons will not return to axis and a so-called wakeless regime is entered. The first plurality of charged particles will perform so called betatron oscillations and this is very similar to the magnetic undulator which is required for an FEL. Very low emittance and energy spreads are required in order to maintain resonance with the produced photon field.

Again, the ultralow emittance and energy spread of the present invention have transformative impact on the ICL.

For the FEL, transport of the first plurality of charged particles into the magnetic undulator is required. Upon exiting the plasma stage, the small transverse bunch sizes down to a few tens of nm which implies a rather large divergence of the emitted first plurality of charged particles. The low energy spread of the present invention allows to capture the emitted beam of the first plurality of charged particles with a permanent magnet quadrupole set. A tunable electromagnetic quadrupole set is then used to collimate and match the beam into an undulator. The ultralow emittance of the first plurality of charged particles and the low energy spread—hence, the ultralow 6D brightness—allows to achieve enormous gain and low wavelengths at comparably low charged particle energies. As an example, start-to-end simulations using electrons as the first plurality of charged particles similar to in the above example show that an ultrahard x-ray FEL can be realized. This FEL lases at a wavelength of 5 Angstrom and with GW-scale x-ray power, in an undulator of sub-10 meter length. This is a performance similar to a state-of-the-art X-ray FEL which is many kilometers long. The FEL enabled by the energy distribution decrease, or dechirped first plurality of charged particles as an embodiment of this invention therefore allows realizing ultrahigh performance FELs in single laboratory scale.

The invention claimed is:

1. A method of accelerating charged particles in a plasma, the method comprising the steps of:
   creating a region of non-uniform electric field within the plasma which propagates through the plasma;
   using the non-uniform electric field to accelerate a first plurality of charged particles in the direction of propagation of the region of non-uniform electric field;
   once the accelerating first plurality of charged particles have propagated part-way through the plasma:
   (A) adding a second plurality of charged particles to the plasma, such that:
      (i) the second plurality of charged particles propagates through the plasma with the accelerating first plurality of charged particles,
      (ii) the second plurality of charged particles creates a local distortion in the non-uniform electric field experienced by the accelerating first plurality of charged particles, and
      (iii) the local distortion in the non-uniform electric field propagates through the plasma with the accelerating first plurality of charged particles; and
   (B) using the local distortion in the non-uniform electric field to accelerate the first plurality of charged particles in the direction of propagation of the region of non-uniform electric field.

2. The method of claim 1, wherein the energy distribution of the first plurality of charged particles broadened due to the non-uniform electric field, and the energy distribution of the first plurality of charged particles is at least partially narrowed due to the local distortion in the non-uniform electric field.

3. The method of claim 1, wherein the energy distribution of the first plurality of charged particles due to the non-uniform electric field and due to the local distortion in the electric field is equal or within a threshold amount.

4. The method of claim 1, wherein at least one of the first or the second plurality of charged particles comprise a group, bunch, collection, packet, or beam of charged particles.

5. The method of claim 1, wherein at least one of the first or the second plurality of charged particles comprise at least one of electrons, positrons, protons, or ions.

6. The method of claim 1, wherein the non-uniform electric field is created by the propagation of a plasma wave through the plasma.

7. The method of claim 6, wherein the plasma wave is created by a laser beam or particle beam interacting with the plasma.

8. The method of claim 1, wherein the plasma comprises a low ionization threshold component and a high ionization threshold component.

9. The method of claim 8, wherein the plasma wave propagates in the low ionization threshold component.

10. The method of claim 1, wherein the first plurality of charged particles are created by the under-dense photocathode Trojan Horse method.

11. The method of claim 8, wherein the second plurality of charged particles are electrons ionized from the high ionization threshold component.

12. A plasma accelerator configured to implement the method of claim 1, the plasma accelerator comprising:
   a plasma generator;
   a first excitation source configured to create the non-uniform electric field which propagates through the plasma and which accelerates the first plurality of charged particles in the direction of propagation of the region of non-uniform electric field or, is configured to create the first plurality of charged particles within the plasma;
   a second excitation source configured to create the second plurality of charged particles within the plasma once the first plurality of charged particles have propagated part-way through the plasma, wherein the second plurality of charged particles propagate through the plasma with the accelerating first plurality of charged particles, create the local distortion in the non-uniform electric field experienced by the accelerating first plurality of charged particles, the local distortion in the non-uniform electric field configured to accelerate the first plurality of charged particles in the direction of propagation of the region of non-uniform electric field; and
   an external controller configured to control when at least one of the first or the second excitation sources interact with the plasma.

13. The plasma accelerator of claim 12, wherein at least one of the first or the second excitation sources comprise at least one laser.

14. The plasma accelerator of claim 12, wherein the plasma generator comprises a heater or an electromagnetic field generator.

15. The plasma accelerator of claim 12, comprising at least one of:
   a first transport system, configured to transport at least one of the first plurality of charged particles or the first excitation source into the plasma; or
   a second transport system, configured to collect the first plurality of charged particles from the plasma.

16. An electromagnetic radiation source comprising the plasma accelerator of claim 12.

17. The electromagnetic radiation source of claim 16, wherein the electromagnetic radiation source is one of:
   a free-electron laser,
   an inverse Compton scattering light source, or
   an ion channel laser.

18. The electromagnetic radiation source of claim 17, wherein the inverse Compton scattering light source or the ion channel laser operate within the plasma of the plasma accelerator.

* * * * *